May 26, 1942. E. S. HINELINE 2,284,486
FOCAL PLANE CAMERA SHUTTER AND FLASH SYNCHRONIZER
Filed May 6, 1939 4 Sheets-Sheet 1

Inventor:
Edson S. Hineline,
Attys

May 26, 1942. E. S. HINELINE 2,284,486
FOCAL PLANE CAMERA SHUTTER AND FLASH SYNCHRONIZER
Filed May 6, 1939 4 Sheets-Sheet 2

Inventor:
Edson S. Hineline,

May 26, 1942.　　　　E. S. HINELINE　　　　2,284,486
FOCAL PLANE CAMERA SHUTTER AND FLASH SYNCHRONIZER
Filed May 6, 1939　　　　4 Sheets-Sheet 3

Inventor:
Edson S. Hineline,

May 26, 1942.　　　　E. S. HINELINE　　　　2,284,486
FOCAL PLANE CAMERA SHUTTER AND FLASH SYNCHRONIZER
Filed May 6, 1939　　　　4 Sheets-Sheet 4

Inventor:
Edson S. Hineline,
by Emery, Booth, Townsend, Miller and Weidner
Attys Patented May 26, 1942

2,284,486

UNITED STATES PATENT OFFICE 2,284,486

FOCAL PLANE CAMERA SHUTTER AND FLASH SYNCHRONIZER

Edson S. Hineline, Rochester, N. Y., assignor to The Folmer Graflex Corporation, Rochester, N. Y., a corporation of Delaware Application May 6, 1939, Serial No. 272,169

14 Claims. (Cl. 67—29)

This invention relates to means for securing photo-flash synchronization with camera shutters, particularly of the focal plane type.

In order that the principle of the invention may be readily understood, I have disclosed two embodiments thereof in the accompanying drawings wherein—

This invention particularly but not exclusively relates to means for synchronizing photo-flash lamps with focal plane shutters of the multiple aperture type. In my invention means is provided to adjust the contact-making means so as to compensate for different conditions that maintain in this type of shutter. It is a well known fact that in a shutter of the multiple aperture type, wherein the total curtain length is relatively long, a variation takes place with respect to the commencement of the curtain operation in relation to the position of the curtain roller. By that, I mean that a curtain aperture will not always pass a given point with a given relationship to curtain roller position. Therefore, I have provided means to adjust or pre-set the contact-making means so as to compensate for this and other variations that take place.

By my invention I also provide means for preventing accidental ignition of the photo-flash bulb, as, for instance, after making an exposure, when a new bulb is inserted and the shutter is rewound. In synchronizers heretofore manufactured, in so far as I know, this contingency has not been provided for. In the practice of my invention the camera curtain can be used wound up or let down for the purpose of selecting any aperture even though a bulb is in place, without causing the bulb to be ignited.

My invention also provides readily detachable means for attaching and detaching the battery case from the camera proper without the necessity of making any electrical connections, since these connections are taken care of automatically. It will be apparent from the disclosure of the details of my invention that the flash bulb is caused to be ignited only when an exposure is to be made.

My invention also furnishes further means of preventing accidental exposure through the provision of a lock on the shutter mechanism, so that the shutter trip-lever cannot inadvertently be operated.

In the disclosed embodiment of my invention, I have elected to show synchronizing mechanism as applied to the Speed Graphic type of camera, but in no way is my invention limited to this type of camera alone, as it may be used with widely varying types of cameras. I have, however, selected the well known Speed Graphic camera to show the application of my invention.

Referring first to Figs. 1 to 6, the camera box or casing is indicated generally at 20. It may be of any suitable character but merely for purpose of explanation of a use of the invention, it is shown as of the Speed Graphic type or form. The camera bed is indicated at 21, the focusing knob at 22, the front shutter at 23 and the front standard at 24. The movable front adjusting screw is represented at 25, the bed arm at 26 and the camera back at 27. The shutter winding mechanism is indicated generally at 28 and the shutter tension mechanism is indicated generally at 29. All of the foregoing parts may be of any suitable or desired construction.

Figures 1, 2, 3, 4:
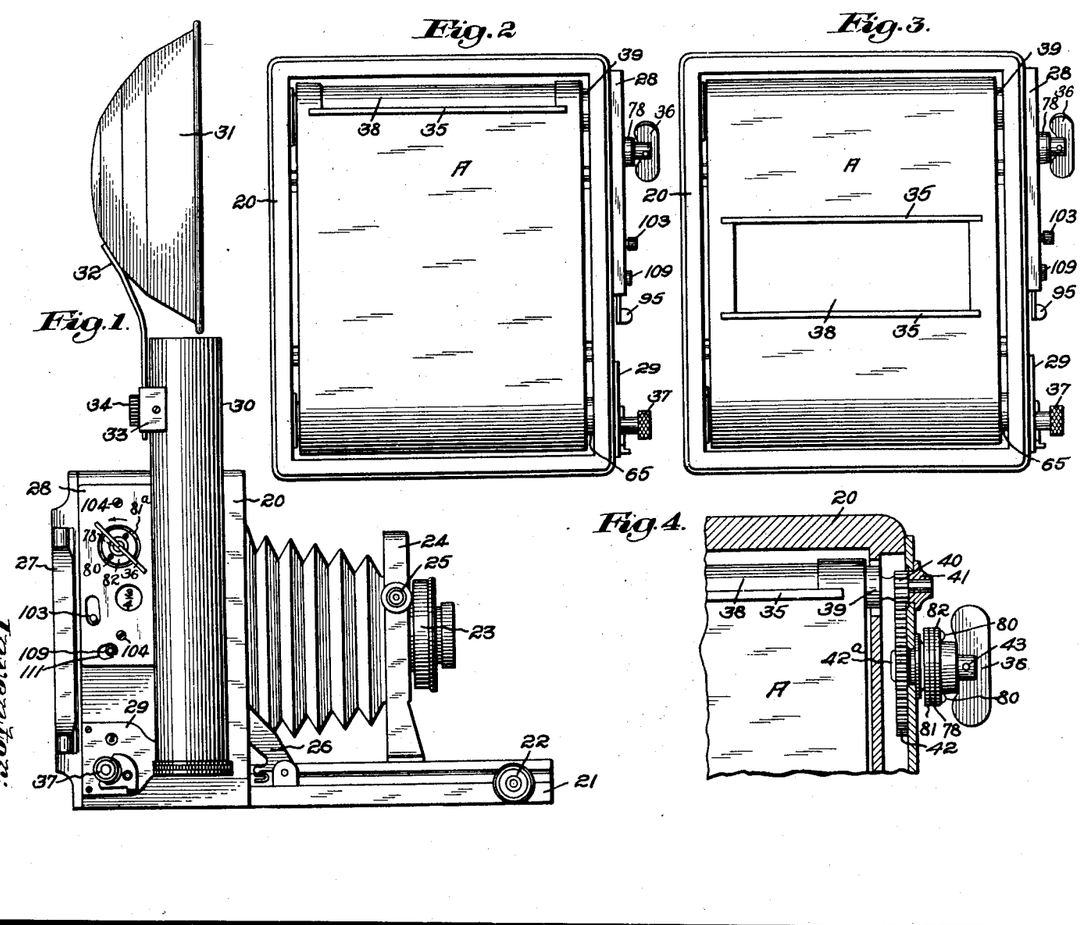
Fig. 1 is a side elevation of a photographic camera with a battery case and reflector in position ready for use in synchronized photo-flash exposure.
Fig. 2 is a rear view of the camera with the back removed showing the focal plane shutter with its curtain in the wound up position.
Fig. 3 is a view similar to Fig. 2, but showing one of the curtain apertures traveling across the focal plane.
Fig. 4 is a partial detail in section of the camera, showing the relationship of the curtain roller, curtain-roller pinion, and curtain-roller winding gear.
Figures 5, 16, 17, 18:
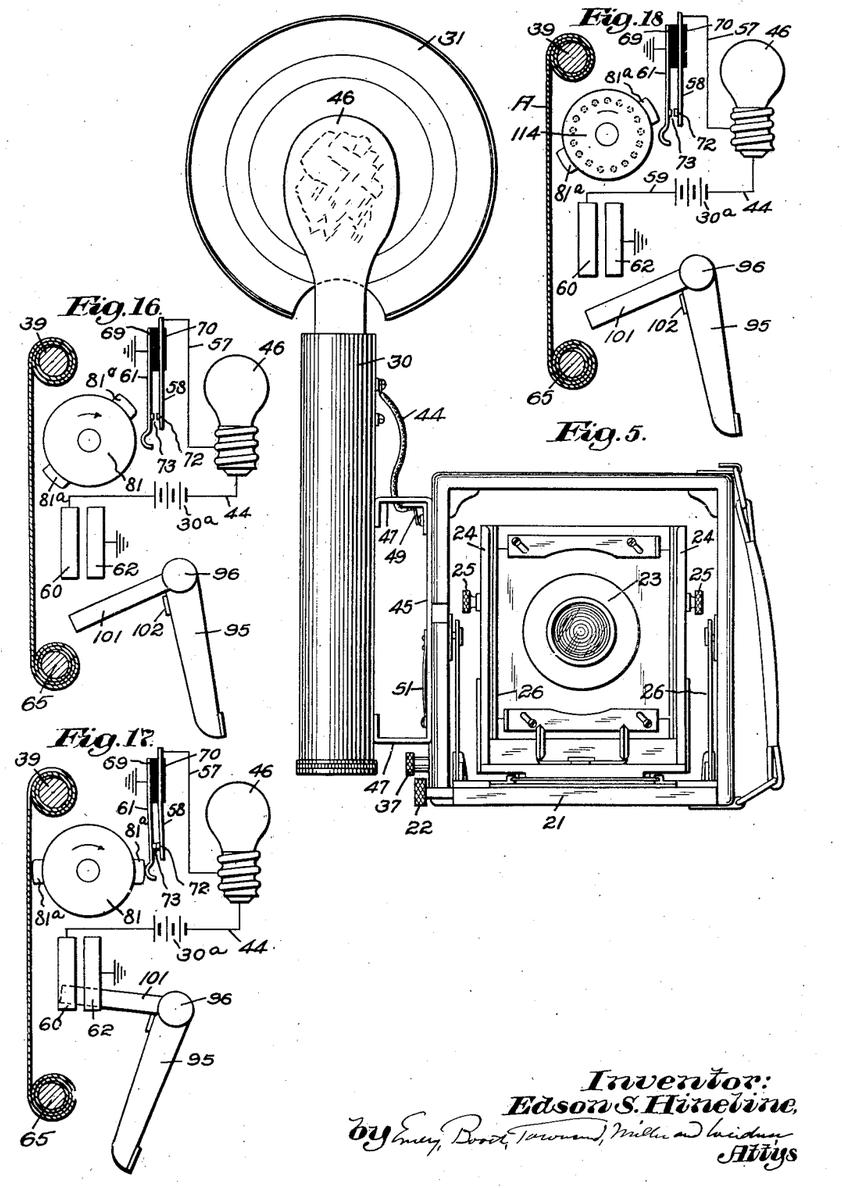
Fig. 5 is a front view of the camera, showing the position of the battery case and the electrical connections therefor, and also showing the photo-flash bulb in place in front of the reflector.
Fig. 16 is a circuit diagram showing the condition of the contacts before an exposure is made.
Fig. 17 is a diagram similar to Fig. 16, but at the time exposure is being made, the diagram showing the contacts closed, thus completing an electrical circuit through the batteries and photo-flash lamp.
Fig. 18 is a diagram similar to Fig. 16, but showing the alternative means for adjusting the contact-making cam.
Figure 6:
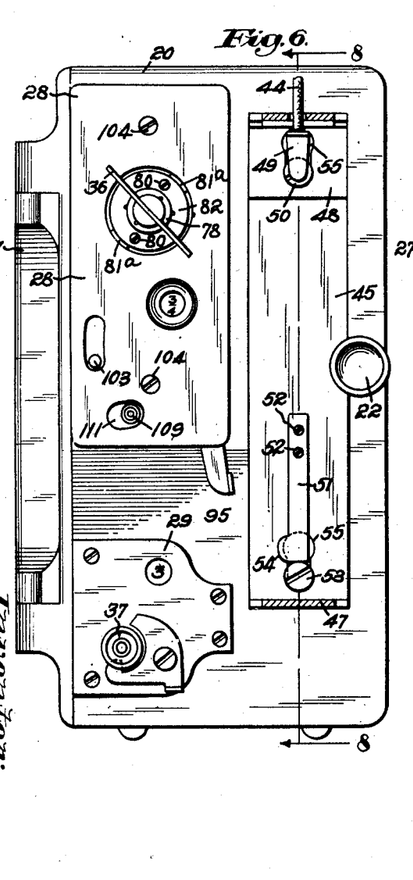
Fig. 6 is a side view of the camera when in closed condition, but is partly in section through the battery case bracket so as more clearly to show the electrical connections.

Referring more particularly to the photo-flash mechanism, the battery case therefor is represented at 30, the reflector at 31, the reflector bracket at 32, the reflector attaching block at 33 and the reflector adjusting screw at 34. These parts in themselves may be of any suitable construction.

Referring more particularly to Figs. 2 and 3, the shutter curtain is indicated generally at A. It may be of any suitable construction and material. It is provided with curtain struts, certain of which are shown at 35. A suitable shutter winding key is provided, as indicated at 36, and a curtain tension winding knob at 37. The usual number of curtain apertures of varying sizes are or may be provided.

Referring more particularly to Figs. 2, 3 and 4, the upper curtain roller is indicated at 39, the curtain-roller pinion at 40, and the curtain-roller bearing at 41. The winding gear is represented at 42, it being fastened to a shaft 42a, best shown in Fig. 10. The said shaft 42a has attached thereto the winding key 36 by means of a pin 43.

Referring to Figs. 5 and 6, an insulated conductor extending from the battery case 30 to the camera box 20 is represented at 44. The battery case bracket is indicated at 45 and the photo-flash bulb at 46. In Fig. 6, the said battery case bracket 45 is broken away in order to show clearly the construction of contacts. The said bracket 45 is provided with oppositely turned ends 47, 47, to which the battery case 30 is attached, as clearly shown in Fig. 5.

Again referring to Fig. 6, attached to the bracket 45 is an insulating member 48 to which a contact 49 is secured. Also attached to contact 49 is the insulated conductor 44 which is connected to the battery case 30. The said contact 49 is shown in electrical connection with the camera contact button shown at 50. Also attached to the bracket 45 is a contact spring 51 secured by screws 52, 52. Said contact spring 51 is in electrical engagement with screw 53, which is also attached to the camera casing. Said contact spring 51 also serves as a lock against the screw 53 when the bracket 45 is in a locked position. Said contact spring 51 has an extending portion 54 in the form of a lip. When said lip 54 is raised, the battery case bracket 45 can be moved downward until contact screws 50 and 53 are in the enlarged portion of the buttonhole form of opening 55 of bracket 45, thus allowing the battery case 30 and the battery case bracket 45 to be removed from the camera. There is also clearly shown in Fig. 6, the location and structure generally of the shutter-winding mechanism, the shutter cover being shown at 28 and the shutter tension plate at 29. These parts will be referred to more particularly presently.

Figure 7:
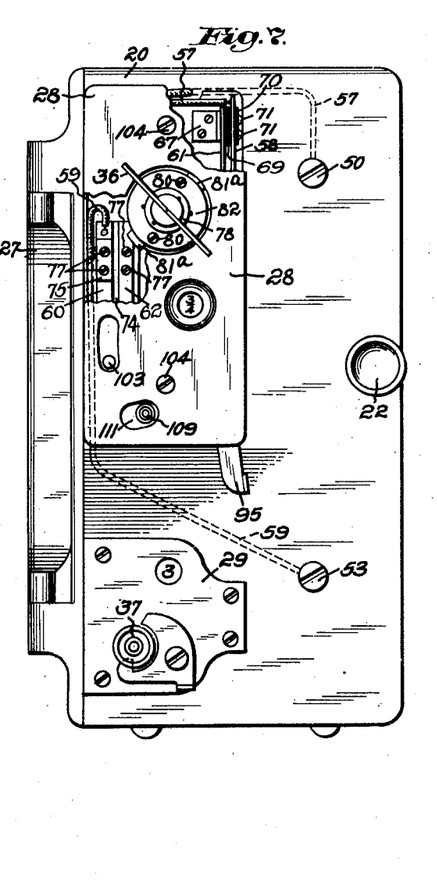
Fig. 7 is a view similar to Fig. 6 but with the battery case removed and with parts of the shutter mechanism housing broken away to show the electrical connections to the contact fingers, the wiring to the battery case contact buttons being shown in dotted lines.

In Fig. 7 is shown the wiring between the contact screws 50 and 53. Therein a wire 57 (shown in dotted lines) is connected to a contact 58, and a wire 59 (shown in dotted lines) is connected at one end to screw 53, and at the other end to a contact finger 60. A second contact 61 completes a circuit through contact screw 50, wire 57, contact 58, and contact 61, which is grounded to the shutter plate indicated best in Figs. 10, 13 and 15 at 66. Also a second contact 62 completes a circuit between contact screw 53, wire 59, contact 60, and said contact 62 which is also grounded to the shutter plate 66.

Figure 8:
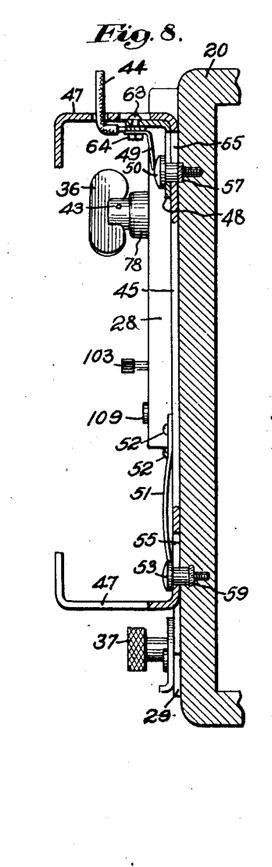
Fig. 8 is a detail in vertical section of a part of the camera case and the battery case bracket, on line 8—8 of Fig. 6, more clearly to show the electrical contacts.

Fig. 8, which is a section of Fig. 6, more clearly shows the construction of battery case bracket. Therein the contact 49 is shown as attached to the insulating member 48 and wire 44 by bolt 63 and nut 64. The insulating member 48 is attached to bracket 45 with flush rivets (not shown). The spring 51 is shown as attached to the bracket 45 by screws 52, 52.

I will next describe in detail the shutter mechanism and in this connection I will refer to Figs. 9 to 13.

Figures 9, 10, 11, 12, 13, 14, 15:
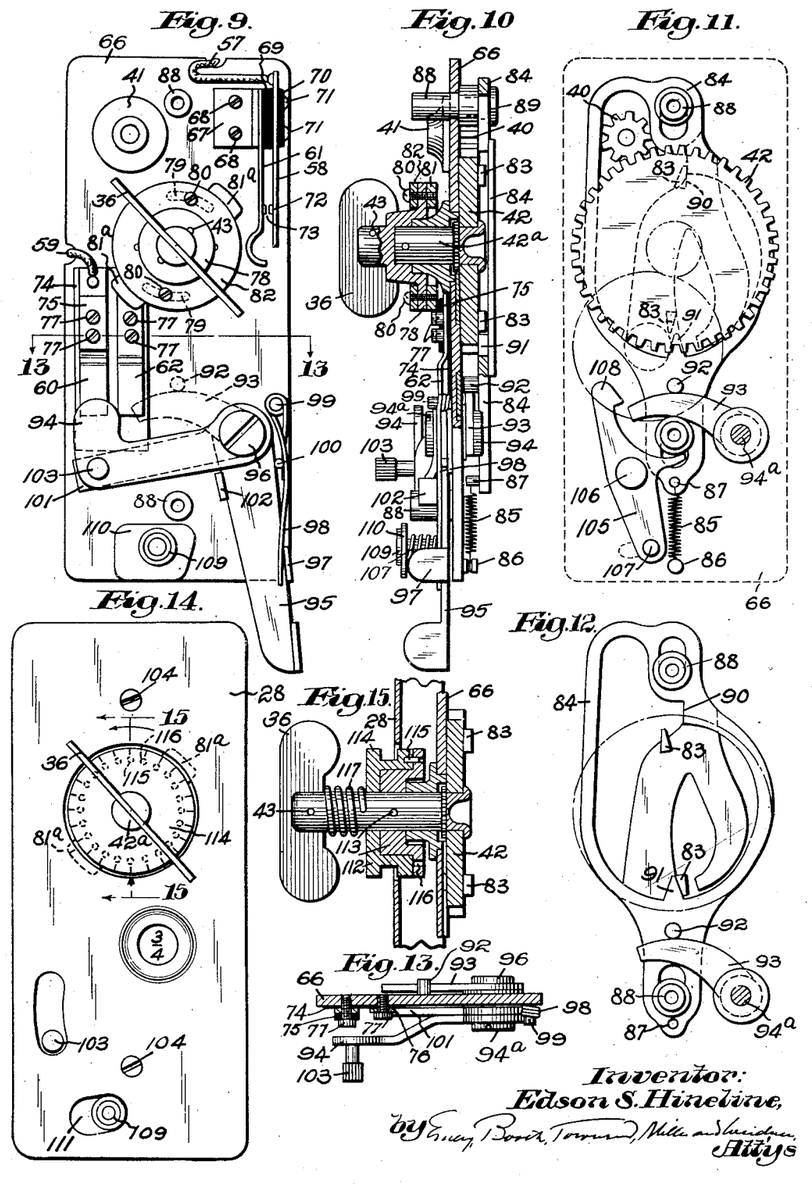
Fig. 9 is a plan view of the shutter plate with the cover removed, showing the mechanism in position before making an exposure.
Fig. 10 is a vertical section through Fig. 9.
Fig. 11 is a plan view of the mechanism with the shutter plate removed, more clearly to show the construction of the shutter operating mechanism.
Fig. 12 is a detail of the shutter escapement mechanism shown in Fig. 11.
Fig. 13 is a transverse section through Fig. 9 on line 13—13 thereof.
Fig. 14 is a plan view showing alternative means for adjusting the shutter timing mechanism.
Fig. 15 is a detail in vertical section through Fig. 14 on line 15—15 thereof.

In Fig. 9 is shown the contact mechanism of the shutter with the shutter cover removed. The shutter plate 66 is shown as having attached thereto said contact springs 58 and 61 by means of a bracket-like member 67, held to the plate 66 by screws 68, 68. Separating said contacts 61 and 58 is an insulating block 69. Overlying contact 58 is a second insulating block 70. The whole structure is attached to said member 67 by screws 71, 71. The contact springs 58 and 61 are provided with contacts 72, 73 respectively.

Also shown as attached to said shutter plate 66 are contacts 60 and 62 having an insulating plate 74 underlying them and insulating plate or plates 75 overlying them. The contact plates 60 and 62 and their respective insulating members are attached to said shutter plate 66 by screws 77, 77.

Attached to the shutter winding shaft 42a, most clearly shown in Fig. 10, is a winding knob member 78, to which the shutter winding key 36 is attached by means of the pin 43. Said member 78 is provided with short circumferentially extending slots 79, 79, most clearly shown in dotted lines in Fig. 9. Passing through said slots 79 are screws 80, 80, which are threaded into the cam plate or member 81 and pass through a ring member 82, thereby clamping said cam plate 81 to the winding knob member 78. Because of the said slots 79, 79 an adjustment of said cam plate or member 81, having cam lobes or swells 81a, 81a, can readily be made, so as to change the position of said cam lobes 81a, 81a with respect to the shaft 42a.

It will readily be seen that if the cam plate or member 81 having the cam lobes or swells 81a, 81a is adjusted in a clockwise direction, the contact points 72, 73 will close earlier in time than if said cam plate 81 with its lobes 81a, 81a were adjusted in a contraclockwise direction and locked in that position. This provides sufficient adjustment of said cam lobes 81a, 81a to take care of any variation and timing necessary to synchronize the photo-flash lamp with respect to any curtain opening 38, since the shaft 42a has attached to it the described gear 42 which meshes with pinion 40 attached to the curtain roller 39.

These gears are most clearly shown in Fig. 11. Therefore, any movement of the curtain roller 39 causes a corresponding movement of said gear 42, causing a corresponding movement of the cam plate or member 81 and its cam lobes 81a, 81a as just disclosed. Thus means is provided for synchronizing the flash and the curtain opening 38, which, so far as I am aware, has never before been accurately accomplished.

The construction of the shutter used in this embodiment of the invention may be and preferably is of a well known design and need not be described fully here, otherwise than to state that for each shutter operation, the said gear 42 is allowed to make a half revolution under the influence of the shutter curtain A when wound up on the shutter tension roller 65 (Figs. 2 and 3).

Said gear 42 is provided with extending dogs or formations 83, 83, most clearly shown in Fig. 12 and in dotted lines in Fig. 11. They are also shown in Fig. 10. To allow the gear 42 to make a half revolution, an escapement plate 84 is provided and is caused to be held in a downward position by a spring 85 attached to pin 86 and hole 87 in said escapement plate 84.

The said escapement plate 84 rides on studs 88, 88, most clearly shown in Fig. 12. The said studs 88, 88 are provided with shoulder screws 89, 89 to hold said escapement plate in position.

It will readily be seen that if the escapement plate 84 is caused to be moved upward, an extending lip 90 of said escapement plate 84 will be withdrawn from the dog 83, best shown in Fig. 11, thus allowing the gear 42 to rotate the dog or formation 83 which engages a second extending portion 91 of the escapement plate 84, and the gear 42 is held from turning until said escapement plate 84 is released, whereupon the spring 85 will withdraw said extending portion 91 from the dog or formation 83, allowing the gear 42 to rotate until said dog 83 again contacts with the lip 90 of said escapement plate 84. This action takes place for each shutter aperture.

When the curtain A is rewound (that is, when the gear 42 is turned in a contraclockwise direction) the escapement plate 84 is caused to ride over the dogs 83 by a camming action until the curtain is fully wound. In order to actuate said escapement plate 84, a pin 92 is provided, which is under-ridden by a pivoted lever arm 93, attached to a second arm or lever 94 by a shaft 94a passing through the shutter plate 66 and having squared ends, one of which is fitted into lever arm 93 and the other into said lever arm 94. Said shaft 94a passes through a shutter operating or release lever 95, the whole being held in place with screws 96, 96. This construction is most clearly shown in Figs. 9 and 13.

The shutter operating or release lever 95 is provided with an upturned portion 97 which is over-ridden by a spring 98 wrapped around a pin 99, attached to the shutter plate 66, and resting against a second pin 100 also attached to the shutter plate 66. The purpose of this spring is normally to hold the shutter release lever 95 in the position shown in Fig. 9.

As has been previously stated, the shutter release lever 95 is provided with a hole through which the shaft 94a extends, thereby coupling the levers 93 and 94 and extending through the shutter plate 66. Forming a part of said shutter operating or release lever 95 is a second lever arm 101, which therefore moves with the lever 95 when said lever 95 is moved in a contraclockwise direction from the position shown in Fig. 17 to that shown in Figs. 16 and 18. Said lever arm 101 when so moved is caused to break the circuit through the contacts 60 and 62, as clearly shown in Figs. 16 and 18. The purpose of this will be hereinafter more fully disclosed.

The said lever 95 (as most clearly shown in Fig. 9) has an upturned member 102 for the purpose of moving lever arm 94 in a clockwise direction when said lever 95 is moved in a clockwise direction. Since levers 94 and 93 are coupled together, any movement of lever 94 will be transmitted to lever 93, thus actuating the shutter.

In the normal operation of making an exposure, the lever 95 is pulled toward the rear of the camera (that is, in a clockwise direction) causing arm 101 to short-circuit (electrically connected) the contacts 60 and 62. The lever 94 is also moved with lever 95 in a clockwise direction under the influence of said upturned member 102. The lever 93 will also be moved in a clockwise direction, thereby forcing pin 92 in the escapement plate 84 to be moved upward, thus releasing gear 42, as previously described, and allowing the shutter winding key 36, shutter winding knob member 78, plate 82, cam plate 81 having cam swells or lobes 81g, 81a to rotate in a clockwise direction, thereby releasing the curtain for the purpose of making an exposure.

When a cam swell or lobe 81a reaches the contact spring 61, contact will be made between contact points 72 and 73, thus completing a circuit through the flash bulb and battery, as shown in Fig. 17. To reset the curtain, the winding key 36 will be turned in a contraclockwise direction, but as cam swell or lobe 81a passes contact spring 61 and closes contacts 72 and 73, a circuit will not be completed because arm 101 has been withdrawn from contacts 60 and 62. This is important because, if a new bulb were to be inserted before the shutter is rewound and no means has been provided to break the circuit, the flash bulb would be ignited when cam swell or lobe 81a passes said contact spring 61.

In a shutter of the multiple aperture type, it is, of course, necessary to select a given shutter aperture. This is done by winding the curtain up on the upper curtain roller 39 or letting it down, thus selecting the proper exposure aperture. It is important that the circuit be not closed when this aperture selection is made, for if the circuit were in a closed condition at that time and a flash bulb were in its socket, the bulb would be ignited and therefore wasted.

I have by my invention provided means for letting down the curtain without closing contacts 60 and 62 by the structure previously disclosed in connection with the shutter release mechanism. Since said shutter operating or release lever 95 is pivoted on shaft 94a which supports levers 94 and 93 and is held in a forward position under the influence of spring 98, said levers 94 and 93 can be operated to release the shutter curtain for the purpose of selecting an aperture, without closing the circuit through contacts 60 and 62.

In order to operate said lever 94, I have provided a pin 103, which extends through the shutter cover plate 28 and is very clearly shown in Figs. 6, 7, 9, 10 and 13. The shutter cover plate is held to the shutter plate 66 by screws 104, 104.

It is important in a shutter synchronizing mechanism such as I have described to be able to lock this mechanism against inadvertent operation, thus locking the focal plane shutter A in open or in closed position as desired. I have provided means for accomplishing this, and have shown the same in Fig. 11. I have as there shown provided a latch arm 105 pivoted on a stud 106. The latch arm 105 has a stud 107 extending through the cover of the shutter winding mechanism 28. If the stud 107 is moved in a clockwise direction, a hook 108 of latch 105 will overlie the end of the lever 93, thus preventing shutter operation. Said stud 107 terminates in a button 109. A plate 110 is provided to underlie the opening 111 (Figs. 6 and 7) of the shutter cover so as to prevent dust from entering. To release the shutter for operation, button 109 is moved in a forward direction, thus withdrawing hook 108 from lever 93. This will allow normal shutter operation.

The mechanism just described is also of value when a camera of the "Press" or "Speed Graphic" type is used with a front shutter. When the front shutter is used, the curtain must be in a full-open condition.

I have provided the above described means to lock the focal plane shutter in the open position, because frequently the front shutter is operated when the focal plane shutter is inadvertently in a closed position, thus preventing an exposure and thereby losing the picture. In some instances the front shutter is also provided with a synchronizing mechanism. In that case a common battery is used. It is again necessary when these conditions prevail to have some means of locking the focal plane shutter so as to prevent the ignition of the flash bulb inadvertently.

In Figs. 14 and 15, I have shown an alternative means for adjusting the cam swells or lobes 81a, 81a without recourse to the use of tools. In such construction a flanged hub 112 is keyed to the shaft 42a by pin 113. Overlying hub 112 is a cylindrical knob 114 provided with a pin 115 which engages a series of holes 116 in hub 112. The said knob 114 is held in contact with hub 112 by influence of spring 117. Cam swells or lobes 81a, 81a are integral with the knob 114. Therefore, any change in knob 114 will cause a corresponding change in the location of cam swells or lobes 81a, 81a with respect to hub 112. This provides means for changing the contact timing with respect to the curtain roller 39. I have therefore provided cam means rotatably mounted and axially slidable on the shutter curtain winding means, and means axially to bias the cam means into a readily releasable interlocking engagement with the winding means in any one of a plurality of rotative positions, whereby the cam means may be manually moved axially against the biasing means and out of interlocking engagement with the winding means and adjusted to a desired rotative position about the winding means.

Having thus described two illustrative embodiments of the invention, it is to be understood that although specific terms are employed, they are used in a generic and descriptive sense and not for purposes of limitation, the scope of the invention being set forth in the following claims.

I claim:

1. Means for effecting synchronization of the flash of a photo-flash lamp with the shutter action of a photographic camera, including a camera having a photo-flash lamp attached thereto, an electric circuit applied to said camera, which circuit includes said lamp, an apertured shutter curtain mounted in said camera for operation therein, rotatable means for winding said curtain and oppositely rotatable during exposure, means carried by the camera and movable for completing and breaking said circuit, thereby to cause the flashing of said lamp by completing the circuit, means to release said shutter curtain to make, during curtain passage, an exposure at an aperture thereof, said means for completing and breaking the electric circuit including a cam mounted upon the camera and operatively connected to the curtain winding means and rotatable therewith, and by its rotation completing said circuit; and means permitting manual adjustment of said cam in a direction to vary the exact instant for completing the circuit, and thereby flashing the lamp with relation to the instant of the exposure-passage of the said aperture of the curtain, so as to effect synchronization of the flashing of the lamp and the exposure-passage of the selected curtain aperture.

2. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, the said manually adjustable means being a manually adjustable cam and means under the quick control of the operator, to vary the position of said cam, thereby varying the instant of the completion of said circuit through said contacts with respect to the exposure-passage of an aperture of the shutter curtain across the focal plane, so as by such variation in the position of said cam to cause synchronization of the flash of the lamp and the exposure-passage of such shutter-curtain aperture.

3. Means for effecting synchronization of the flash of a photo-flash lamp with the shutter action of a photographic camera, including a camera having a photo-flash lamp attached thereto, an electric circuit applied to said camera, which circuit includes said lamp and also includes a pair of adjacent contacts to be opened and closed; a windable, plural-apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means being of a camming structure and acting once during each substantially 180° of the travel of said rotatable means in its rotative movement in the unwinding of said shutter curtain, to complete said circuit by closing said pair of contacts serving to cause the flashing of said lamp, and then to break the said circuit by opening the said contacts, and by its said manual adjustment varying the instant of the completion of the said circuit through said contacts with respect to the exposure passage of the shutter-curtain aperture across the focal plane, so as, by reason of such manual adjustment, to cause simultaneous flashing of the lamp at the exposure passage of the shutter-curtain aperture across the focal plane, and means to release said shutter curtain so as to make an exposure at an aperture thereof.

4. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof, the said manually adjustable means being an adjustable cam mounted and operatively connected to rotate both in the curtain winding and curtain functioning movements.

5. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof, the shutter curtain winding means including a gear fast on a shaft, and the said manually adjustable means being a cam fast with said shaft of such curtain winding gear, said cam being manually adjustable with respect to said shaft in either direction circumferentially of said gear.

6. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof, the shutter curtain winding means including a winding shaft having a winding key, and also including a winding gear 42 fast on such winding shaft, and a cam plate 81 fast with such winding gear 42, said cam plate 81 having a formation that, in the exposure movement of the curtain, acts upon the release of the said curtain to close the circuit and then permit the breaking thereof.

7. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof; the said circuit also including means at which the circuit may be completed and broken, said last-mentioned means being in series with the said contacts, and co-acting means for completing or breaking the circuit at said in-series means, said co-acting means being mechanically connected with the said means to release the shutter curtain, so as to move therewith, and thus providing means for releasing the shutter curtain without completing the circuit through the flash lamp.

8. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof, the said manually adjustable means comprising cam means readily mounted on the shutter curtain-winding means and having an adjustment-permitting structure-formation extending circumferentially of said cam means to permit the biasing adjustment of said cam means to any desired rotative position about the winding means, thereby varying the instant of the completion of said circuit through said contacts with respect to the exposure-passage of an aperture of the shutter curtain across the focal plane, so as by such variation in the position of said cam means to cause synchronization of the flash of the lamp and the exposure-passage of such shutter-curtain aperture.

9. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, the said shutter curtain having a plurality of exposure apertures, an escapement for the shutter curtain, and lever arms 93, 94 conjointly movable to operate said escapement, the means to release the shutter curtain including a lever 95 which in its movement also closes the lamp circuit, which for that purpose is provided with a switch in series with said contacts controlled by the winding means, and independent of which lever 95 the said arms 93, 94 may be moved to operate said shutter curtain, the said lever 95 in its movement acting through the lever arms 93, 94 to operate the shutter curtain, whereby different apertures of the said shutter curtain may be preselected without closing the lamp circuit.

10. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, the said shutter curtain being provided with a plurality of exposure apertures, and the said circuit including two spaced contacts 60, 62, in series with said first mentioned contacts controlled by said winding means, an escapement for the said shutter curtain, and conjointly movable lever arms 93, 94 mounted in operative relation to and cooperating with said escapement to actuate the same, and thus prevent exposure movement of the shutter curtain, the said shutter curtain release means being a shutter release lever having a lever arm 101 so operatively connected thereto as to move therewith, the said lever arm 101 cooperating with the said spaced contacts 60, 62 of the electric circuit to make and break the circuit in functioning and non-functioning movements respectively of the shutter curtain.

11. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, the said circuit having two spaced contacts 60, 62 at which the circuit may be broken, said contacts 60, 62 being in series with said first mentioned contacts controlled by said winding means, an escapement for the shutter release mechanism, and lever arms 93, 94 mounted in operative relation to and cooperating with the said escapement, to actuate the same and thereby permit movement of the shutter curtain, and a shutter release lever 95 having a projection 102 to engage in its movements the said lever arm 94, and thereby cause it to move the shutter release lever 95, said lever 95 having a lever arm 101 attached to and movable therewith to make or to break the circuit at said contacts 60, 62.

12. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, said circuit also having two spaced contacts 60, 62 in series with said first mentioned contacts controlled by said winding means, and means moved by the means to release the shutter, thereby to bridge across the said two contacts 60, 62 to complete the circuit or to break the circuit by withdrawal from said contacts 60, 62.

13. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; means to release said shutter curtain so as to make an exposure at an aperture thereof, the said manually adjustable means comprising cam means rotatably mounted on and axially slidable on the shutter curtain winding means, and means axially to bias the cam means into a readily releasable interlocking engagement with the winding means in any one of a plurality of rotative positions, whereby the cam means may be manually moved axially against the biasing means and out of interlocking engagement with the winding means and adjusted to a desired rotative position about the winding means, thereby varying the instant of the completion of said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane.

14. Means for effecting synchronization of the flash of a photo-flash lamp with the shutter action of a photographic camera, including a camera having a photo-flash lamp attached thereto, an electric circuit applied to said camera, which circuit includes said lamp and also includes contacts to be opened and closed, a windable apertured shutter curtain mounted in said camera for operation therein; means, rotatable in both directions of movement of said shutter curtain, for winding up said shutter curtain in one direction of its said rotatable movement; readily accessible, manually adjustable means carried by the camera casing and operatively connected to and rotatable with said shutter-curtain winding means in both directions of rotation of said winding means, said manually adjustable means, in its rotative movement in the unwinding of said shutter curtain, functioning to complete said circuit by closing said contacts, thereby to cause the flashing of said lamp and then to break the said circuit by opening the said contacts and by its said manual adjustment varying the instant of the completion of the said circuit through said contacts with respect to the exposure passage of the shutter-curtain aperture across the focal plane so as, by reason of such manual adjustment, to cause simultaneous flashing of the lamp at the exposure passage of the shutter-curtain aperture across the focal plane; and means to release said shutter curtain so as to make an exposure at an aperture thereof, the said shutter curtain being a multiple aperture curtain, and said manually adjustable means comprising cam means rotatably mounted on and axially slidable on the shutter curtain winding means; and means axially to bias the cam means into a readily releasable interlocking engagement with the winding means in any one of a plurality of rotative positions, whereby the cam means may be manually moved axially against the biasing means and out of interlocking engagement with the winding means and adjusted to a desired rotative position about the winding means, thereby to vary the exact instant for completing the circuit through said contacts and the flash of the lamp with relation to the instant of the exposure-passage of the said selected curtain aperture across the focal plane, so as to effect synchronization of the flash of the lamp in the exposure-passage of the said selected curtain aperture.

EDSON S. HINELINE.